United States Patent [19]
Magruder et al.

[11] 3,797,798
[45] Mar. 19, 1974

[54] VEHICLE SEAT WITH SUSPENSION AND SELECTIVE SUSPENSION LOCK-OUT

[75] Inventors: Michael Keith Magruder, Waterloo; Terrill Wayne Woods, Cedar Falls, both of Iowa

[73] Assignee: Deere & Company, Moline, Ill.

[22] Filed: June 26, 1972

[21] Appl. No.: 265,976

[52] U.S. Cl. .............................................. 248/399
[51] Int. Cl. ............................................. B60n 1/02
[58] Field of Search ............ 248/399, 400, 162, 421

[56] References Cited
UNITED STATES PATENTS

| | | | |
|---|---|---|---|
| 3,727,974 | 4/1973 | Swenson et al. | 248/399 |
| 3,178,148 | 4/1965 | Manke | 248/399 |
| 3,268,200 | 8/1966 | Eicher | 248/399 |
| 3,504,881 | 4/1970 | Pillons et al. | 248/399 |
| 3,519,240 | 7/1970 | Swenson | 248/399 |

*Primary Examiner*—Marion Parsons, Jr.

[57] ABSTRACT

A resiliently suspended vehicle seat with means for selectively locking out the resiliency of the suspension to fix the seat against both up and down movement.

6 Claims, 6 Drawing Figures

PATENTED MAR 19 1974  3,797,798
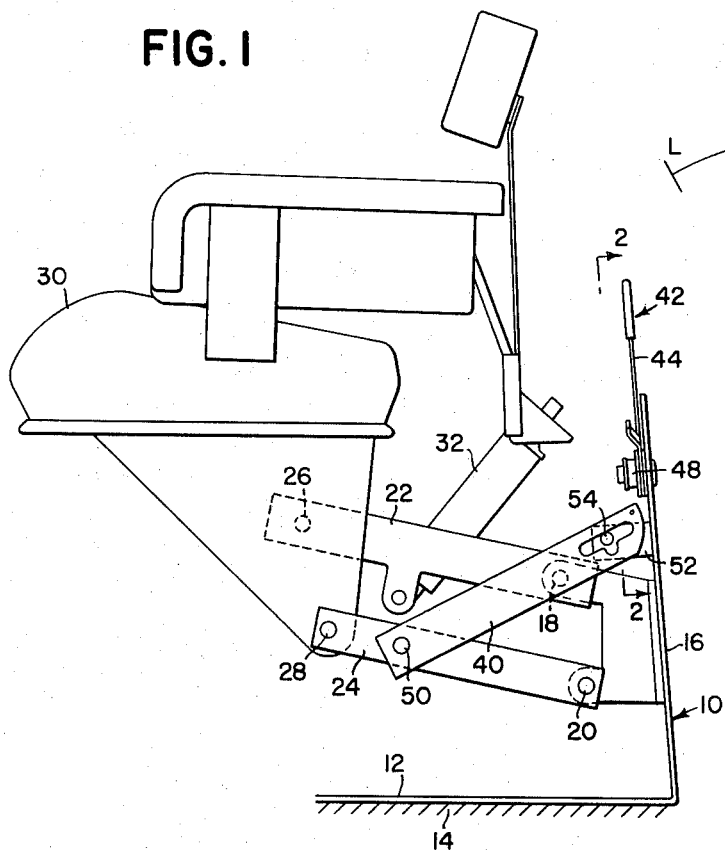
FIG. 1
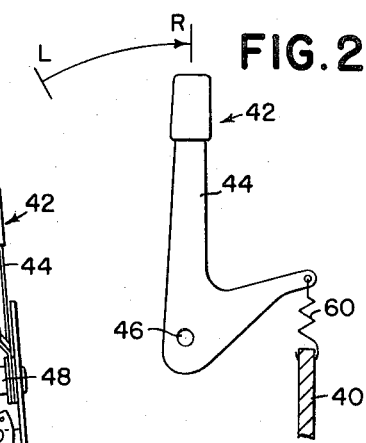
FIG. 2
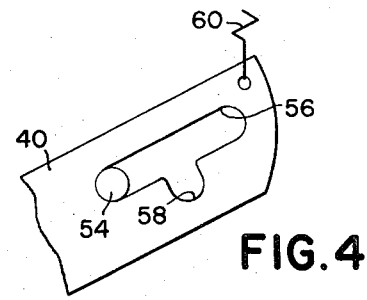
FIG. 6
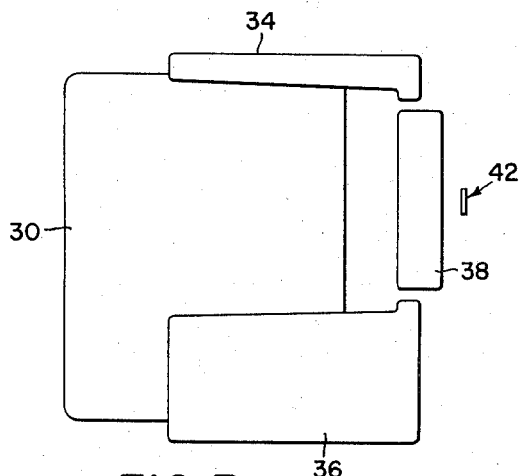
FIG. 3
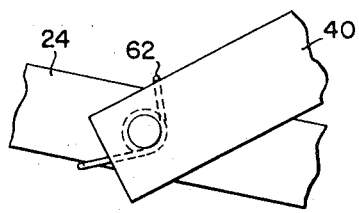
FIG. 4
FIG. 5

3,797,798

VEHICLE SEAT WITH SUSPENSION AND SELECTIVE SUSPENSION LOCK-OUT

BACKGROUND OF THE INVENTION

It is conventional in off-the-road vehicles, such as farm tractors, road graders, scrapers and similar vehicles, to provide a seat suspended, typically by so-called parallel linkage combined with a spring and shock-absorber unit, for controlled and adjustable up and down movement of the rider according to such variables as rider size and weight, terrain, etc. In some instances, the controlled up and down movement of the seat may prove to be a temporary disadvantage; e.g., when the load on the seat is in excess of the ability of the suspension system to handle it, when the resiliency of the suspension is apt to cause undue upward movement, etc. In the former instance, as when the seat is designed primarily for one person but has provision for seating a second person in certain circumstances, the combined weight of the two riders is such as to depress the seat to a level below that at which the driver can safely see ahead.

In the latter instance, efforts have been made in the prior art to utilize secondary control means for limiting at least the upward movement of the seat so that the rider cannot be "pitched" from the seat during excessively rough conditions, but none of these have operated on the basis of fixing the seat, selectively, in a position in which the driver's vantage point is insured.

SUMMARY OF THE INVENTION

Broadly, the present invention provides a selective lock-out of the usual suspension so that the seat is fixed against movement both up and down out of a selected position, and more specifically a position in which the driver retains full view of the road, field, etc. ahead. What is achieved here is that the suspension and lock-out are so coordinated that the suspension may function in its normal manner but may be easily converted to a rigid system under selected conditions. The control or selector for choosing between normal and locked conditions is so designed that it may be "pre-selected;" i.e., the locked condition may be selected even during downward or upward positions of the seat and final locking will occur automatically upon release or depression of the seat for movement to its upper or lower positions.

The last-named feature includes a control linkage that accommodates normal movement of the parts even though it has a biasing means conditioning the lock-out for locking. The control itself, preferably in the form of an easily accessible control member, is conveniently located, simple in construction and requires little if any maintenance.

BRIEF DESCRIPTION OF THE DRAWINGS

FIG. 1 is a side elevation of a typical seat and suspension in which the invention finds utility.

FIG. 2 is an enlarged view generally along the line 2—2 of FIG. 1.

FIG. 3 is a reduced-scale view of a "two-man" seat as representative of a condition in which a suspension lock-out is desirable.

FIG. 4 is an enlarged view of parts of the lock-out.

FIG. 5 is a fragmentary view of a modification.

FIG. 6 is a fragmentary view of a further modification.

DESCRIPTION OF THE PREFERRED EMBODIMENT

A support member 10 of L shape has a horizontal portion 12 adapted in usual manner to be attached rigidly to a vehicle frame or body 14 and an upright leg 16 which has vertically spaced pivots 18 and 20 for mounting the rear ends of a pair of upper and lower so-called parallel links 22 and 24, the front ends of which are pivotally connected at 26 and 28 to a seat member 30. A combination spring and shock-absorber unit 32 completes a typical seat suspension that carries the seat member 30 for up and down movement. The links 22 and 24 may be regarded as members forming part of the suspension means that includes the unit 32 as well as the links, pivots, etc.

As best seen in FIG. 3, the seat is relatively wide but is primarily intended for one-man use by delineation of arm rests 34 and 36, the latter of which is relatively wide and which may be swung upwardly and rearwardly, not only to make the total width of the seat available for an extra rider but to combine with a fixed seat back 38 to complete a wide seat back. This feature is not part of the present invention but is disclosed as an example to illustrate the desirability for a lock-out means. As will be appreciated, if the suspension means 22, 24, 32 is designed to accommodate a single rider, it will become overloaded by the presence of two riders on the same seat, the result being that the seat will be depressed to down position in which the driver does not have full command of the view ahead. The solution is to retain the seat in an elevated condition; i.e., to prevent its undue depression under overload.

This is achieved here by locking the seat in its up or near up position by means that prevents the seat from moving in either vertical direction out of the locked position. Preferably this is accomplished by a single simple lock link 40 and a control 42.

The control is in the form of a bell-crank lever 44 pivoted to the upright part 16 of the support 10 at 46 for lateral swinging between an "L" (lock position) and an "R" (release position). See FIG. 2. For retaining the control against inadvertent movement out of its selected position, the pivot 46 includes any suitable retaining means, here a spring-loaded friction device 48. The control is mounted centrally behind the seat back 38.

The lock link 40 is pivoted at its front end to the suspension means, here by means of a pivot 50 to the lower suspension link 24 and extends rearwardly into proximity to a lug 52 and pin 54 fixed to the support means member or leg 16, at which point the rear end of the link 40 is provided with means selectively engageable with and disengageable from the support member 10. This means comprises, here, an elongated slot 56 in the link 40 (FIG. 4) which has a shorter, angular slot 58 in communication therewith. These slots are selectively engageable with the pin or guide 54. Normally—i.e., when the suspension is unlocked or released—, the link 40 has relatively free movement as the link 40, via the long slot 56, runs back and forth on the pin 54, the weight of the link 40 causing the slot 56 to ride on its top edge on the pin 54. The length of the slot 56 is determined according to the fore-and-aft movement required as the suspension links 22 and 24 move up and down. Thus, normally, the short slot 58 is free from engagement with the pin 54.

When it is desired to lock the seat and its suspension as and for the purposes already described herein, the link 40 is raised by the control 42, accomplished here by a link including resilient means such as a tension spring 60 (FIGS. 1, 2 and 4). This biases the link 40 upwardly, so that when the pin 54 and short slot 58 become alined, the link 40 will move upwardly, under the force of the spring 60, to engage the slot 58 with pin 54, thus locking the suspension against further movement until the control 42 is moved to its "R" position. For example, should the seat 30 be completely unloaded, the pin 54 will be at the forward end of the slot 56 (FIG. 4) and the lever 42 be moved to its "L" position, the spring 60 will load the link 40 upwardly. When load is applied to the seat, the link 40 will move rearwardly for about one-half the length of the slot 56 and the upward bias on the link 40 will cause the link to ride on the pin 54 until the short slot 58 engages the pin 54. Conversely, should the seat be fully depressed, as by two riders, the pin 54 will be at the rear end of the long slot 56, but when the seat rises, the short slot 58 will engage the pin 54 because of the spring load imposed by the spring 60. The point of engagement of the pin and slot 54–58 is preferably selected on the basis of the ideal vantage point of the driver, having respect to his view of the path, road, field, etc., ahead.

Although it is expected that the weight of the link 40 may be relied upon to benefit from the force of gravity and thus cause the top edge of the slot 56 normally to ride the pin 54, besides which the tension spring 60, usually "loose," may be expected to exert a downward force on the link 40, it may be desirable to impose additional downward forces on the link 40 during "release" condition.

FIG. 5 shows one way of doing this; i.e., by adding a downward spring load to the link 40, as by a torsion spring 62. Of course, the tension spring 60 must be stronger than the spring 62. A further example is suggested in FIG. 6, in which the spring 60 is supplemented by a guide 64 fixed to the top of the link 40 to assure that at least some compressive force will be applied through the spring 60 in the release position of the control 42.

We claim:

1. A vehicle seat structure having a support member, a rider-carrying seat member, and yielding suspension means including a movable member carrying the seat member on the support member for relative up and down movement, characterized by lock means for selectively positively locking the seat member against both up and down movement and for releasing the seat member for up and down movement, said lock means including an element pivoted on and carried by one member and having an elongated slot therein and a second slot angled to the elongated slot, another member has a guide carrying the element by means of the elongated slot when the seat member is released for up and down movement, and control means for effecting relative shifting movement between said element and guide for receipt of the guide in the angled slot so as to lock the seat member against up and down movement.

2. The invention defined in claim 1, further characterized in that the element is biased so that the top edge of the elongated slot normally rides on the guide, the angled slot depends from the elongated slot, and the control means is operative to elevate the element relative to the guide to receive the latter for locking the seat member.

3. The invention defined in claim 1, further characterized in that the element is so pivoted to the one member that it tends to swing downwardly by gravity, the top edge of the elongated slot normally rides on the guide, the angled slot depends from the elongated slot, and the control means is operative to elevate the element relative to the guide to receive the latter for locking the seat member.

4. The invention defined in claim 3, in which the control means is movable between lock and release positions, a link means is connected between the control means and the element to move the element upwardly when the control means is moved to its lock position.

5. The invention defined in claim 4 in which the link means includes a resilient connection for imparting a lifting bias to the element when the control means is moved to its lock position.

6. The invention defined in claim 4, further characterized in that releasable means is provided for holding the control means in its lock position.

* * * * *